(12) United States Patent
Houck et al.

(10) Patent No.: US 9,146,329 B2
(45) Date of Patent: Sep. 29, 2015

(54) SYSTEM AND METHOD FOR RECONSTRUCTION OF TIME-LAPSE DATA

(75) Inventors: Richard T. Houck, Houston, TX (US); Ramesh Neelamani, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 938 days.

(21) Appl. No.: 13/127,145

(22) PCT Filed: Dec. 4, 2009

(86) PCT No.: PCT/US2009/066705
§ 371 (c)(1),
(2), (4) Date: May 2, 2011

(87) PCT Pub. No.: WO2010/077569
PCT Pub. Date: Jul. 8, 2010

(65) Prior Publication Data
US 2012/0014218 A1    Jan. 19, 2012

Related U.S. Application Data

(60) Provisional application No. 61/138,451, filed on Dec. 17, 2008.

(51) Int. Cl.
G01V 1/00       (2006.01)
G01V 1/28       (2006.01)

(52) U.S. Cl.
CPC ........................................ G01V 1/28 (2013.01)

(58) Field of Classification Search
CPC ........... G01V 1/00; G01V 11/00; G01V 1/30; G01V 1/308; G01V 1/32
USPC ......................................................... 367/72
See application file for complete search history.

(56) References Cited

U.S. PATENT DOCUMENTS

| 3,921,126 A | 11/1975 | Waters |
| 4,784,189 A | 11/1988 | Hellström |

(Continued)

FOREIGN PATENT DOCUMENTS

| CA | 2 542 416 | 5/2005 |
| GB | 2 372 567 | 8/2002 |

(Continued)

OTHER PUBLICATIONS

Hennenfent et al., "Sparseness-constrained data continuation with frames: Applications to missing traces and aliased signals in 2/3-D", SEG Technical Program Expanded Abstracts, 2162-2165, SEG (2005).*

(Continued)

*Primary Examiner* — Krystine Breier
(74) *Attorney, Agent, or Firm* — ExxonMobil Upstream Research Compay, Law Dept.

(57) ABSTRACT

Techniques are disclosed for performing time-lapse monitor surveys with sparsely sampled monitor data sets (11). An accurate 3D representation (e.g., image) of a target area (e.g., a hydrocarbon bearing subsurface reservoir) is constructed using the sparsely sampled monitor data set (e.g., seismic data set). The sparsely sampled monitor data set may be so limited that it alone is insufficient to generate an accurate 3D representation of the target area, but accuracy is achieved through use of certain external information (14). The external information may include predetermined base survey data from a first time that is used (12) to interpolate data that is not recorded in the sparsely sampled monitor data set to derive a fully sampled monitor data set that can be processed (e.g., using conventional processing techniques) for determining an accurate representation of the target area at a second time.

13 Claims, 4 Drawing Sheets

(56) References Cited

U.S. PATENT DOCUMENTS

| | | | |
|---|---|---|---|
| 4,884,248 A | 11/1989 | Laster et al. | |
| 4,969,130 A | 11/1990 | Wason et al. | |
| 4,992,996 A | 2/1991 | Wang | |
| 5,018,112 A | 5/1991 | Pinkerton et al. | |
| 5,148,406 A | 9/1992 | Brink et al. | |
| 5,586,082 A | 12/1996 | Anderson et al. | |
| 5,629,904 A | 5/1997 | Kosloff et al. | |
| 5,638,269 A | 6/1997 | Fournier et al. | |
| 5,796,678 A | 8/1998 | Pisetski | |
| 5,798,982 A | 8/1998 | He et al. | |
| 5,831,935 A | 11/1998 | Luo et al. | |
| 5,870,690 A | 2/1999 | Frenkel et al. | |
| 5,873,051 A | 2/1999 | Van Bemmel et al. | |
| 5,878,372 A | 3/1999 | Tabarovsky et al. | |
| 5,905,657 A | 5/1999 | Celniker | |
| 5,986,974 A | 11/1999 | Luo et al. | |
| 6,028,820 A | 2/2000 | Pisetski | |
| 6,041,018 A | 3/2000 | Roche | |
| 6,057,561 A | 5/2000 | Kawasaki et al. | |
| 6,070,125 A | 5/2000 | Murphy et al. | |
| 6,125,330 A | 9/2000 | Robertson et al. | |
| 6,266,619 B1 | 7/2001 | Thomas et al. | |
| 6,317,384 B1 | 11/2001 | Luo et al. | |
| 6,356,844 B2 | 3/2002 | Thomas et al. | |
| 6,374,201 B1 | 4/2002 | Grizon et al. | |
| 6,389,361 B1 | 5/2002 | Geiser | |
| 6,438,069 B1 | 8/2002 | Ross et al. | |
| 6,498,989 B1 | 12/2002 | Pisetski et al. | |
| 6,529,833 B2 | 3/2003 | Fanini et al. | |
| 6,553,315 B2 | 4/2003 | Kerekes et al. | |
| 6,560,540 B2 | 5/2003 | West et al. | |
| 6,574,563 B1* | 6/2003 | Nickel | 702/14 |
| 6,614,717 B1 | 9/2003 | Khan et al. | |
| 6,691,075 B1 | 2/2004 | Winbow et al. | |
| 6,694,263 B2 | 2/2004 | Fournier et al. | |
| 6,715,551 B2 | 4/2004 | Curtis et al. | |
| 6,763,304 B2 | 7/2004 | Schonewille | |
| 6,763,305 B2 | 7/2004 | Bernitsas | |
| 6,778,918 B2 | 8/2004 | Delhomme et al. | |
| 6,801,858 B2 | 10/2004 | Nivlet et al. | |
| 6,826,483 B1 | 11/2004 | Anderson et al. | |
| 6,829,538 B2 | 12/2004 | De Kok | |
| 6,853,921 B2 | 2/2005 | Thomas et al. | |
| 6,876,928 B2 | 4/2005 | Van Riel et al. | |
| 6,889,142 B2 | 5/2005 | Schonewille | |
| 6,904,368 B2 | 6/2005 | Reshef et al. | |
| 6,906,982 B2 | 6/2005 | Calvert | |
| 6,912,466 B1 | 6/2005 | Gao | |
| 6,980,940 B1 | 12/2005 | Gurpinar et al. | |
| 6,985,404 B2 | 1/2006 | Mallick | |
| 6,989,841 B2 | 1/2006 | Docherty | |
| 7,027,354 B2 | 4/2006 | Cole et al. | |
| 7,027,929 B2 | 4/2006 | Wang | |
| 7,079,952 B2 | 7/2006 | Thomas et al. | |
| 7,162,463 B1 | 1/2007 | Wentland et al. | |
| 7,167,414 B2 | 1/2007 | Lee et al. | |
| 7,242,637 B2 | 7/2007 | Van Den Bekel et al. | |
| 7,254,999 B2 | 8/2007 | Bostick, III | |
| 7,298,671 B2 | 11/2007 | Brinkmann et al. | |
| 7,333,392 B2 | 2/2008 | Burnstad | |
| 7,355,923 B2 | 4/2008 | Reshef et al. | |
| 7,376,539 B2 | 5/2008 | Lecomte | |
| 7,456,113 B2 | 11/2008 | Rayandayan et al. | |
| 7,478,024 B2 | 1/2009 | Gurpinar et al. | |
| 7,523,003 B2 | 4/2009 | Robertsson et al. | |
| 7,577,061 B2 | 8/2009 | Williamson et al. | |
| 7,620,534 B2 | 11/2009 | Pita et al. | |
| 7,660,711 B2 | 2/2010 | Pita et al. | |
| 7,739,089 B2 | 6/2010 | Gurpinar et al. | |
| 7,752,022 B2 | 7/2010 | Fornel et al. | |
| 7,797,996 B2 | 9/2010 | Bostick, III | |
| 7,840,625 B2* | 11/2010 | Candes et al. | 708/402 |
| 7,843,766 B2* | 11/2010 | Levin | 367/40 |
| 7,859,943 B2 | 12/2010 | Herwanger | |
| 7,953,585 B2 | 5/2011 | Gurpinar et al. | |
| 8,086,426 B2 | 12/2011 | El Ouair et al. | |
| 8,280,695 B2* | 10/2012 | Neelamani et al. | 702/191 |
| 2006/0153005 A1 | 7/2006 | Herwanger et al. | |
| 2006/0285435 A1 | 12/2006 | Robertsson | |
| 2008/0004847 A1 | 1/2008 | Bradford | |
| 2008/0170468 A1 | 7/2008 | Brain et al. | |

FOREIGN PATENT DOCUMENTS

| | | |
|---|---|---|
| WO | WO 99/67660 | 12/1999 |
| WO | WO 00/19240 | 4/2000 |
| WO | WO 2004/090575 | 10/2004 |
| WO | WO 2005/066660 | 7/2005 |
| WO | WO 2009/011735 | 1/2009 |
| WO | WO 2009/051899 | 4/2009 |
| WO | WO 2009/027420 | 5/2009 |
| WO | WO 2010/075568 | 7/2010 |
| WO | WO 2010/077569 | 7/2010 |

OTHER PUBLICATIONS

Sarka, S. et al. (2003), "On the inversion of time-lapse seismic data," *SEG Expanded Abstracts* 22, 4 pgs.

Barkved, O.I. et al. (2005), "Valhall Permanent Seismic Monitoring—Reducing Geological Model Uncertainties Using 4-D Seismic," *EAGE Expanded Abstract*.

Beyreuther, M. et al. (2005), "Computation of time-lapse differences with 3D directional frames," XP002550568, SEG/Houston Annual Meeting, pp. 2488-2492.

Candes, E. et al. (2006), "Fast Discrete Curvelet Transforms," *Mutiscale Model. Simul.* 5(3), pp. 861-899.

Ceragioli, E. et al. (2006), "Filling the Gap—Integrating Nodes and Streamer Data for Geophysical Monitoring Purposes," *EAGE Expanded Abstract*, 5 pgs.

Curtis, (2004), "Theory of Model-based Geophysical Survey and Experimental Design," *The Leading Edge* 23, pp. 997-1004.

Foster, D.G. (2006), "Lessons Learnt from over 20 years of 4-D Deployment," SPE 11352, 2008 Indian Oil & Gas Tech. Conf. & Exh., 11 pgs.

Hermann, F.J. et al. (2008), "Curvelet-based seismic data processing: A multiscale and nonlinear approach," *Geophysics* 73(1), pp. A1-A5.

Huang, X. et al. (1997), "Reservoir Characterization by Integration of Time-Lapse Seismic and Production Data," SPE 38695, 1997 SPE Annual Tech. Conf. & Exh., pp. 439-447.

Kaldy, W.J. et al. (2006), "Short Cable 4D Investigation—Case History from the Amberjack field in the Gulf of Mexico," SEG/New Orleans Annual Meeting, pp. 3170-3174.

Landrø, M. et al. (2004), "Time lapse refraction seismic—a toll for monitoring carbonate fields?" *SEG Expanded Abstract*.

Landrø, M. et al. (2005), "Pressure depletion measured by time-lapse VSP," *The Leading Edge*, pp. 1226-1232.

Lüth, S. et al. (2005), "Fresnel volume migration of multicomponent data," *Geophysics* 70(6), pp. S121-S129.

Sahni, I. et al. (2005), "Multiresolution Wavelet Analaysis for Improved Reservoir Description," XP-002550569, 2005 SPE Reservoir & Evaluation & Engineering, pp. 53-69.

Smit, F. et al. (2006), "Toward affordable permanent seismic reservoir monitoring using the sparse OBC concept," *The Leading Edge*, pp. 454-459.

Staples, R. et al. (2006), "Time-Lapse (4D) Seismic Monitoring—Expanding Applications," 2006 CSPG,—CSEG, CWLS Convention, pp. 181-189.

European Search Report, dated Oct. 27, 2009, EP 09 15 8924.

International Search Report and Written Opinion, dated Feb. 5, 2010, PCT/US2009/066705.

\* cited by examiner

SYSTEM AND METHOD FOR RECONSTRUCTION OF TIME-LAPSE DATA

CROSS-REFERENCE TO RELATED APPLICATIONS

This application is the National Stage of International Application No. PCT/US2009/066705, that published as WO 2010/077569, filed 4 Dec. 2009, which claims the benefit of U.S. Provisional Application No. 61/138,451, filed 17 Dec. 2008, each of which is incorporated herein by reference, in its entirety, for all purposes.

TECHNICAL FIELD

The following description relates generally to acquisition and processing of seismic data for generating a 3D representation (e.g., image(s)) of a target subsurface area, such as a target hydrocarbon bearing subsurface reservoir, and more particularly to techniques for performing time-lapse seismic surveying using sparsely acquired seismic data.

BACKGROUND

In geological exploration it is desirable to obtain information regarding the various formations and structures that exist beneath the Earth's surface. Such information may include determining geological strata, density, porosity, composition, etc. This information may then be used to generate a representation of the subsurface basin using the obtained data to predict the location of hydrocarbon reserves and aid in the extraction of hydrocarbons.

A general objective of seismic processing is to image subsurface reflectors. In a general prospecting operation, during a seismic survey, seismic energy is generated by a source and travels as body waves into subsurface regions to reflectors, and then returns to receivers (e.g., geophones). The reflected energy received may then be processed to determine a representation of the subsurface region (e.g., via imaging) to, for example, analyze the location of hydrocarbon reserves.

Three-dimensional (3D) seismic survey techniques are well-known in the art. In general, seismic monitor data (e.g., the above-mentioned reflected energy collected by a receiver, such as a geophone) is acquired for a target area (or "field") that is of interest, and such seismic monitor data is processed to form a representation of the subsurface region that is the target area. The representation of the subsurface may take any of various different forms, including an image of the subsurface at various depths. Such representation of the subsurface may identify the geological formations (e.g., location, shape, etc. of different geological materials/objects), including hydrocarbon bearing underground reservoirs of fluids (e.g., oil, gas, water). Conventional 3D seismic surveys include three dimensions relating to the spatial characteristics of the subsurface formation. Generally, two dimensions correspond to horizontal length dimensions, and the third dimension relates to depth in the subsurface formation, which can be represented by a length coordinate (or by a time coordinate, such as the two-way travel time of a seismic wave from surface to a certain depth and back).

Seismic surveying techniques generally investigate the subsurface formation by generating seismic waves that travel through the subsurface formation, and measuring the time the waves need to travel between one or more seismic sources and one or more seismic receivers. The travel time of a seismic wave is dependent on the length of the path traversed, and the velocity of the wave along the path. 3D seismic surveying is commonly employed when analyzing a target field for potential drilling to extract fluids (e.g., for determining whether and/or where in the target field to drill). As discussed further herein, such 3D seismic surveying has traditionally been computationally intensive, expensive, and have involved significant time to produce.

Time-lapse seismic surveying is increasingly used for studying of subsurface formations. It is applied for monitoring of hydrocarbon bearing underground reservoirs, in particular to follow the effects resulting from producing (i.e., "extracting") reservoir fluids (e.g., oil, gas, water) through a well to the surface.

In time-lapse seismic surveying, seismic data is acquired at two or more points in time. Time is therefore an additional parameter with regard to conventional seismic surveying. This is useful in studying the changes in seismic properties of the subsurface as a function of time due to, for example, spatial and temporal variation in fluid saturation, pressure, temperature, and/or other seismic properties. Conventionally, such time-lapse seismic surveying involves performing the above-mentioned 3D surveying at different points in time. Thus, time-lapse seismic surveying is also referred to as 4-dimensional (4D) seismic surveying, wherein time between seismic data acquisitions represents a fourth data dimension. As in the above-mentioned 3D surveying, the three other dimensions relate to the spatial characteristics of the earth formation. The time span between the first and the second point in time at which seismic data are acquired may be several years. Conventionally, one normally tries to acquire the first and second seismic data sets in a similar manner, so that the data sets are easier to compare.

Time-lapse (or "4D") seismic surveying has become a common tool for monitoring changes in producing hydrocarbon reservoirs. The information about changes in reservoir fluid distribution and pore pressure provided by time-lapse surveys is useful in making decisions in reservoir management. Decisions affected by time-lapse seismic surveying include placement of infill wells and control of production and injection rates to maximize oil recovery efficiency, as examples.

The typical implementation of time-lapse seismic involves collecting a sequence of 3D seismic surveys over a producing reservoir, and using the representations (e.g., images) generated from the recorded seismic data to infer changes in reservoir conditions over time. For economic reasons, some time-lapse surveys have been collected using conventional marine streamer acquisition, where a boat sails a grid of lines over the reservoir, continuously activating seismic sources and recording data using receivers in long streamers towed behind the boat. However, the method has also been implemented using receivers placed on the sea floor, in bore-holes, and, for onshore fields, using conventional 3D land acquisition methods.

The first survey in the time-lapse sequence, commonly called the "base survey," is ideally acquired before production starts. The processed image generated from the base survey measures the initial seismic response of the reservoir. One or more later surveys, called "monitor surveys," are acquired at time intervals that depend on the expected dynamic properties (e.g., fluid distribution and pressure) of the reservoir; e.g., one to three year intervals are typical.

The reservoir image generated from a monitor survey is different from the base survey image. Some of this difference is due to changes in dynamic reservoir properties; and some is due to a variety of other factors not related to reservoir changes. Differences between base and monitor images that are not associated with reservoir changes, commonly called "non-repeatability", can mask the differences that indicate reservoir changes. Minimizing non-repeatability is one of the objectives of time-lapse acquisition and processing for seismic or other data types, such as electromagnetic and/or magnetic data.

Acquiring and processing a full 3D monitor survey is time-consuming and expensive. For instance, with seismic data, the time required to acquire, process and interpret a given survey can exceed one year, and the cost associated with acquiring and processing a full 3D monitor seismic survey may be upwards of twenty million U.S. dollars. The delay in time required for a full 3D monitor seismic survey can result in missed opportunities for affecting reservoir management decisions. And, the cost of the seismic survey may exceed the benefits of the information that results from the seismic survey. Consequently, reducing the time and the cost of time-lapse seismic surveys has been an ongoing industry objective.

One approach that has been proposed for reducing the time and cost of time-lapse surveys is to permanently install an array of seismic receivers over the reservoir. See e.g., Barkved, O. I., K. Buer, and T. G. Kristiansen, 2005, *Valhall Permanent Seismic Monitoring—Reducing Geological Model Uncertainties Using 4-D Seismic*, EAGE 2005 Expanded Abstract. Once the receivers are in place, repeated seismic surveys can be acquired at relatively low cost by activating appropriate seismic sources over the receivers. However, although the cost of a repeat survey is lowered in this approach, the initial cost of installing the receiver array in the first place is undesirably high. Full permanent installations are generally economically advantageous when the field is small and shallow (so it can be covered without having to use a large number of receivers), and when the field has a long production life (so the cost of the installation can be spread over many monitor surveys). Because they are appropriate under a limited set of conditions, full permanent installations are rarely used.

A second approach is simply to record less seismic data in monitor surveys, thereby attempting to reduce cost and/or time involved with performing the monitor surveys. This approach has been tested with permanent (see Smit, F., M. Ligtendag, P. Wills, and R. Calvert, 2006, *Toward Affordable Permanent Seismic Reservoir Monitoring Using the Sparse OBC Concept*, The Leading Edge) and redeployable (see Ceragioli, E., A. Kabbej, A. Gonzalez Carballo, and D. Martin, 2006, *Filling the Gap—Integrating Nodes and Streamer Data for Geophysical Monitoring Purposes*, EAGE 2006 Expanded Abstract) sea-bottom receivers, and with short marine streamers (see Kaldy, W. J., K. Hartman, P. Sen, C. Barousse, D. Stauber, and E. Xu, 2006, Short cable 4D investigation—*Case History from the Amberjack Field in the Gulf of Mexico*, SEG 2006 Expanded Abstract). These tests indicate that 3D seismic images generated from a limited seismic data set were contaminated with levels of non-repeatable noise and imaging artifacts that were too high for most time-lapse applications.

One way to avoid artifacts that arise from conventional 3D imaging is by not performing 3D imaging. Time-lapse 2D imaging, as reported by Staples, R, J. Stammeijer, S. Jones, J. Brain, F. Smit, and P. Hatchell, 2006, *Time-Lapse (4D) Seismic Monitoring—Expanding Applications*, CSEG Expanded Abstract, is faster and cheaper than 3D imaging, and a 2D image does not contain the same kind of artifacts as a reduced-data 3D image. However, 2D imaging has its own shortcomings that make it inappropriate for time-lapse surveys, except in special circumstances. For instance, such 2D imaging assumes that the subsurface variations take place in the direction of the 2D line. This assumption is generally not satisfied in the actual subsurface region being targeted, so a 2D image is always a distorted version of the true subsurface.

Other methods that do not use 3D imaging are time-lapse refraction (see Landrø, M., A. K. Nguyen, and H. Mehdizadeh, 2004, *Time-Lapse Refraction Seismic—A Tool for Monitoring Carbonate Fields*, SEG 2004 Expanded Abstract), and time-lapse vertical seismic profile (VSP) (see Landrø, M., P. Digranes, and L. K. Strønen, 2006, *Pressure Depletion Measured by Time-Lapse VSP*, The Leading Edge, 24, 1226), but these are also useful only under special circumstances.

SUMMARY

In view of the above, a need exists in the art for a technique for performing time-lapse monitor surveys in a more time-efficient and economical manner. For instance, a technique for performing time-lapse monitor surveys by acquiring less data (e.g., seismic data) is needed. However, it is also desirable for a technique that can use such a sparsely sampled monitor data set for generating an accurate 3D representation (e.g., 3D seismic image) of the target area (e.g., subsurface hydrocarbon reservoir) being analyzed, wherein the generated 3D representation is not contaminated with unacceptably-high levels of non-repeatable noise and imaging artifacts.

Ideally, one would like to use a sparsely sampled seismic monitor data set, which could be acquired and processed quickly and at low cost, to obtain information about dynamic reservoir changes, where the information has quality similar to information derived from fully sampled 3D surveys. As mentioned above, prior efforts at accomplishing this have demonstrated that eliminating part of the data that is conventionally acquired may also eliminate some of the information about reservoir changes because it results in a 3D representation that is contaminated with high levels of non-repeatable noise and/or imaging artifacts.

The present invention is thus directed generally to systems and methods for performing time-lapse monitor surveys with sparsely sampled monitor data sets. For instance, systems and methods are disclosed for performing a time-lapsed monitor survey that enables an accurate 3D representation (e.g., image) of a target area (e.g., reservoir) to be constructed using a sparsely sampled monitor data set that is acquired for a monitor survey. As used herein, "accurate" means a result that closely resembles (e.g., within a specified threshold or error range) the actual earth model. In embodiments of the present invention, the obtained sparsely sampled monitor data set is so limited that it alone is insufficient to generate accurate 3D representation of the target area. That is, the sparsely sampled monitor data set alone is insufficient to, through use of known 3D imaging techniques; produce a 3D representation having a desired resolution for confident analysis of the target area. However, accuracy of the 3D representation is enabled through the use of certain external information in addition to the obtained sparsely sampled monitor data set to generate the 3D representation. That is, the sparsely sampled monitor data set that is obtained for a time-lapsed monitor survey may be processed with other external information, such as certain information that is predetermined (e.g., in an earlier base survey) and/or certain information that is predicted or derived (e.g., from an earlier base survey), to generate an accurate 3D representation of the target area at the point in time of acquisition of the sparsely sampled monitor data set.

In general, in the context of the present application, a sparsely sampled monitor data set refers to a data set (e.g., seismic data set, electromagnetic data set or other suitable data set) that is received from a configuration of sources and receivers where conventional imaging (i.e., migration) is inapplicable, or where conventional migration produces an image that is inadequate for time-lapse analysis. As one example of acquisition of sparsely sampled seismic monitor data, an arrangement of source and receiver locations such as that disclosed in the example of FIG. 4 of the aforesaid PCT International Application based on U.S. Provisional Patent Application Ser. No. 61/138,446 titled "Method for Imaging of Targeted Reflectors" may be employed, which has enough sources and receivers to cover the entire target area, but the sources and receivers are arranged such that the migrated image they produce is contaminated with artifacts. The sparsely sampled monitor data set may, in some instances, be data sets that are so limited that conventional migration does not produce an image that represents the real subsurface with sufficient accuracy for time-lapse analysis. In the most basic terms, a "sparsely sampled" monitor data set is a data set for which the sampling at acquisition was less dense than in a "fully sampled" base data set. However, as disclosed further herein, such sparsely sampled monitor data sets may be used with external data for enhanced analysis of the target area.

According to one embodiment, a base survey is initially conducted for a target area, wherein the base survey may be performed in a conventional manner in which fully sampled base data sets are acquired for processing to generate an accurate 3D representation of the target area as it exists at the point in time at which the fully sampled base data sets are acquired. At some point in time later, a time-lapsed monitor survey is performed, wherein a sparsely sampled monitor data set is acquired for the target area. Time and/or cost associated with conducting the later time-lapsed monitor survey may be reduced from that associated with the base survey because less data is acquired. As one example of acquisition of the sparsely sampled seismic monitor data set, an arrangement of source and receiver locations such as that disclosed in the example of FIG. 4 of the aforesaid PCT International Application based on U.S. Patent Application Ser. No. 61/138,446 titled "Method for Imaging of Targeted Reflectors" may be employed. This exemplary sparsely sampled survey records about a factor of forty less seismic data than is needed to image the same area with conventional 3D imaging techniques using a traditional fully sampled seismic data acquisition.

In embodiments of the present invention, the sparsely sampled monitor data set that is acquired for the later time-lapsed seismic monitor survey is so limited that it alone is insufficient to generate an accurate 3D representation of the target area. A conventional fully sampled 3D survey records many "extra" traces to meet the requirements of 3D imaging. Failing to meet these requirements traditionally produces imaging artifacts that are particularly problematic for time-lapse interpretation. Embodiments of the present invention enable a more sparse sampling of seismic monitor data to be acquired for use in generating a 3D representation of the target area. For instance, in certain embodiments, such as discussed further in the aforesaid PCT International Application based on U.S. Provisional Patent Application Ser. No. 61/138,446 titled "Method for Imaging of Targeted Reflectors", targeted imaging is performed, which may, depending on the size and depth of the target, enable the sparsely sampled data acquisition to be reduced by a factor of twenty to fifty fewer traces than are traditionally utilized for fully sampled seismic data for conventional 3D imaging techniques. Other embodiments, such as those discussed further herein and those discussed further in the aforesaid PCT International Application based on U.S. Provisional Patent Application Ser. No. 61/138,447 titled "System and Method for Performing Time-Lapse Monitor Surveying Using Sparse Monitor Data", may enable even fewer traces to be acquired in the sparsely sampled seismic monitor data set, depending on details of the target. Of course, there is a tradeoff involved, as the "extra" traces may be useful for reducing the effect of recorded noise. Thus, for noisy target areas, more data traces may be desirable.

The sparsely sampled monitor data set that is acquired for the time-lapsed monitor survey is then processed with other external information, such as certain information that was predetermined (e.g., in an earlier base survey) and/or certain information that is predicted or derived (e.g., from an earlier base survey), to generate an accurate 3D representation of the target area at the later point in time at which the sparsely sampled monitor data set is acquired.

Certain embodiments of this invention use one or more sparsely sampled monitor data sets to monitor subsurface hydrocarbon reservoir changes by using external information, either from seismic or non-seismic sources, to replace some of the information lost by reducing the amount of recorded data. The external information that is used may differ according to different embodiments.

In one embodiment, such as discussed further herein, the external information may be information that was predetermined and/or derived from an earlier base survey of the target area. For example, as discussed further herein, in certain embodiments the external information includes a transformation of a base survey.

An accurate representation of the target area may be initially determined (e.g., prior to determining to drill the target area) by conducting a full 3D seismic survey (i.e., a "base survey") at a first time period. In a time-lapsed survey conducted at a second time period (that is later in time than the first time period,), a sparsely sampled seismic monitor data set is acquired (e.g., from sparsely-located receivers in the target area). The base survey data is used to interpolate data that is not recorded in the sparsely sampled seismic monitor data set to derive a full data set that can be processed (e.g., using conventional processing techniques) for determining an accurate representation of the target area at the second time period.

A transformation technique is used for transforming the fully sampled base survey data set into a transformation domain that is useful for representing wave fields. According to one embodiment, a transformation technique, which is referred to as "curvelets", is used to transform the fully sampled base survey data set into a curvelet domain. The transformed fully sampled base survey data set is then processed/modified by applying the obtained sparsely sampled monitor data set thereto. In one embodiment, the smallest change that can be made to the transformed fully sampled base survey data set that reproduces the acquired sparsely sampled monitor data set is determined.

The modified transformed fully sampled base survey data set is then used for constructing a fully sampled monitor data set. In one embodiment, the inverse of the modified transformed fully sampled base survey data set is determined to provide the fully sampled monitor data that can be input to a conventional imaging system to compute a 3D representation (e.g., image) of the target area as it exists at the second time period (at which the sparsely sampled monitor data set was acquired).

Thus, only a portion of the fully sampled monitor data set that would be required to be processed for determining an accurate representation (e.g., accurate image) of the target area is acquired in the monitor survey; a transform of fully sampled base survey data (e.g., using a curvelet transform) is used to determine other monitor data (that is not acquired) to arrive at a fully sampled monitor data set that is then processed to determine an accurate representation (e.g., 3D image) of the target area at the second time period.

According to one embodiment, a method for reconstructing a fully sampled time-lapse monitor survey is provided. The method includes acquiring, at a first time, fully sampled base data set for a base survey of a target area (e.g., a hydrocarbon bearing subsurface reservoir). The method further includes recording, at a second time that is different from the first time (e.g., typically one to three years later), a sparsely sampled monitor data set (e.g., seismic traces) for the target area (e.g., a subsurface area). The recorded sparsely sampled monitor data sets are preferably capable of being used to indicate changes in response of specific sections of the target area (e.g., seismic or electromagnetic). The method further includes transforming the fully sampled base data set into an appropriate domain, such as a curvelet domain. The method further includes determining a smallest change to the transformed fully sampled base data set (i.e., the transformed base survey) that, when inverse transformed, reproduces the sparsely sampled monitor data set. The method then includes modifying the transformation domain by the determined smallest change, and inverse transforming the modified transformed fully sampled base data set to generate a fully sampled monitor data set for the target area as it exists at the second time. A "fully sampled monitor data set" means, for example, a data set for which the sampling is the same as for the fully sampled base data set. Then, conventional 3D imaging may be employed for processing the generated fully sampled monitor data set to compute a 3D representation of the target area as it exists at the second time.

According to one embodiment, a method for performing a time-lapsed survey (e.g., seismic) of a target area is provided. The method includes determining a fully sampled base data set for the target area at a first time, wherein the fully sampled base data set can be processed for determining an accurate 3D representation of the target area as it exists at the first time. The method further includes obtaining and/or acquiring a sparsely sampled monitor data set for the target area at a second time that is later than the first time, wherein the obtained sparsely sampled monitor data set is insufficient alone for determining an accurate 3D representation of the target area as it exists at the second time. The method further includes computing, based on the obtained sparsely sampled monitor data set, a transformation of the base survey, and processing the transformed base survey to determine an accurate 3D representation of the target area as it exists at the second time.

Thus, according to certain embodiments, as discussed further herein, the external information may include a predetermined fully sampled base survey of the target area, wherein the base survey may be transformed and modified to match the sparsely sampled seismic monitor data set acquired in a later monitor survey to result in derivation of full 3D seismic monitor data set that can be processed for computing an accurate 3D representation (e.g., 3D image) of the target area under analysis. Thus, instead of trying to perform a full interpretation of the sparsely sampled seismic monitor data set, in certain embodiments; such sparsely sampled seismic monitor data set is used to modify the base survey data set to derive a fully reconstructed seismic monitor data set that is usable to generate a 3D representation of the target area.

In certain embodiments, as discussed further in the aforesaid PCT International Application based on U.S. Provisional Patent Application Ser. No. 61/138,447 titled "System and Method for Performing Time-Lapse Monitor Surveying Using Sparse Monitor Data", the disclosure of which is incorporated herein by reference, the external information may include alternative models of the target area that are representative of different predictions regarding how the target area may change over a lapse of time. For instance, an accurate representation of the target area may be initially determined (e.g., prior to determining to drill the target area) by conducting a fully sampled base seismic survey (i.e., a "base survey"), and the alternative models may represent changes that may occur in the target area over a lapse of time. The alternative models may, for example, reflect differences in permeability of at least a portion of the target area. Thus, the models may reflect how the initially-determined 3D representation of the target area (as determined in the base survey) may change over the time lapse based on whether a permeability barrier, low permeability, or high permeability is encountered in the target area. The obtained sparsely sampled seismic monitor data set may then be processed to determine which of the plurality of alternative models is representative of the target area. Thus, instead of trying to perform a full interpretation of the sparsely sampled seismic monitor data set, in certain embodiments; such sparsely sampled seismic monitor data set is used to determine which of the plurality of alternative models is representative of the target area as it exists at the time of acquisition of the sparsely sampled seismic monitor data set.

In certain embodiments, as discussed further in the aforesaid PCT International Application based on U.S. Provisional Patent Application Ser. No. 61/138,446 titled "Method for Imaging of Targeted Reflectors", the disclosure of which is incorporated herein by reference, the external information may include information accurately identifying a shape of the reflector(s) present in the target area. For instance, as mentioned above, an accurate representation of the target area may be initially determined (e.g., prior to determining to drill the target area) by conducting a fully sampled seismic base data set (i.e., a "base survey"). From the base survey, an accurate shape of the reflectors is determined. In an additional time-lapsed monitor survey, a sparsely sampled seismic monitor data set is obtained, and additional data/processing need not be performed to determine the shape of the reflector(s) because these are already known. Instead, the predetermined shape (known from the base survey) is used to compute, from the sparsely sampled seismic monitor data set, the amplitude data from the reflectors of the target area at the later time.

Thus, according to certain embodiments, external information is utilized in designing the acquisition and/or processing of the monitor data set, thereby enabling a sparsely sampled seismic monitor data set to be acquired for the monitor survey while also enabling generation of an accurate 3D representation of the target area.

Conventional seismic surveys typically use some kind of external information in acquisition design and processing. Certain embodiments of the present invention differ from conventional seismic surveys in that the external information functions not as a supplementary aid, but as a necessary input to overcome certain deficiencies of 3D imaging, or in some embodiments, for circumventing 3D imaging altogether. Typically, conventional time-lapse approaches try to generate a monitor image entirely from the acquired/recorded seismic data. External information may be used in conventional techniques in, for example, building a velocity model, but the 3D image of the target area is constructed using only the acquired/recorded seismic data. Embodiments of the present invention further employ appropriate external information to construct an accurate 3D image for the target area as it exists at the time that the sparsely sampled seismic monitor data set is acquired.

Conventional imaging methods normally used to process time-lapsed seismic data in a monitor survey make no assumptions about the target area (e.g., reservoir) that is being analyzed. Consequently, in conventional imaging methods the acquired seismic data typically supplies the information needed to construct a 3D reservoir image. The incomplete information provided by a sparsely sampled seismic monitor data set, alone, is inadequate for constructing images that are sufficiently repeatable for time-lapse analysis. As discussed further with certain embodiments of the present invention, certain external information is used to compensate for the incompleteness of the sparsely sampled seismic monitor data set. For instance, transformable base survey information for the target area is employed in certain embodiments to aid in deriving, from the obtained sparsely sampled seismic monitor data set, a full monitor data set that can be processed for generating an accurate 3D representation of the target area as it exists at the time that the sparsely sampled seismic monitor data set was acquired.

Not all forms of external information are capable of replacing absent seismic information. According to certain embodiments of the present invention, the external information utilized is selected to sufficiently constrain the reservoir to enable the sparsely sampled seismic monitor data set that is acquired to disambiguate the condition/state of the reservoir. Examples of external information that can function this way include:

1. a fully sampled and interpreted 3D base seismic survey of the target area, such as described further herein;

2. a set of specific reservoir model scenarios that have different interpretations and fluid flow properties, such as described further in the aforesaid PCT International Application based on U.S. Provisional Patent Application Ser. No. 61/138,447 titled "System and Method for Performing Time-Lapse Monitor Surveying Using Sparse Monitor Data", the disclosure of which is incorporated herein by reference; and 3. a structure map of a particular reservoir reflector, such as described further in the aforesaid PCT International Application based on U.S. Provisional Patent Application Ser. No. 61/138,446 titled "Method for Imaging of Targeted Reflectors", the disclosure of which is incorporated herein by reference.

In certain embodiments, some interpretation takes place before acquisition and processing of the sparsely sampled seismic monitor data set for a monitor survey, and the results of the interpretation are part of the structure of the acquisition and processing of the sparsely sampled seismic monitor data set.

The foregoing has outlined rather broadly the features and technical advantages of the present invention that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
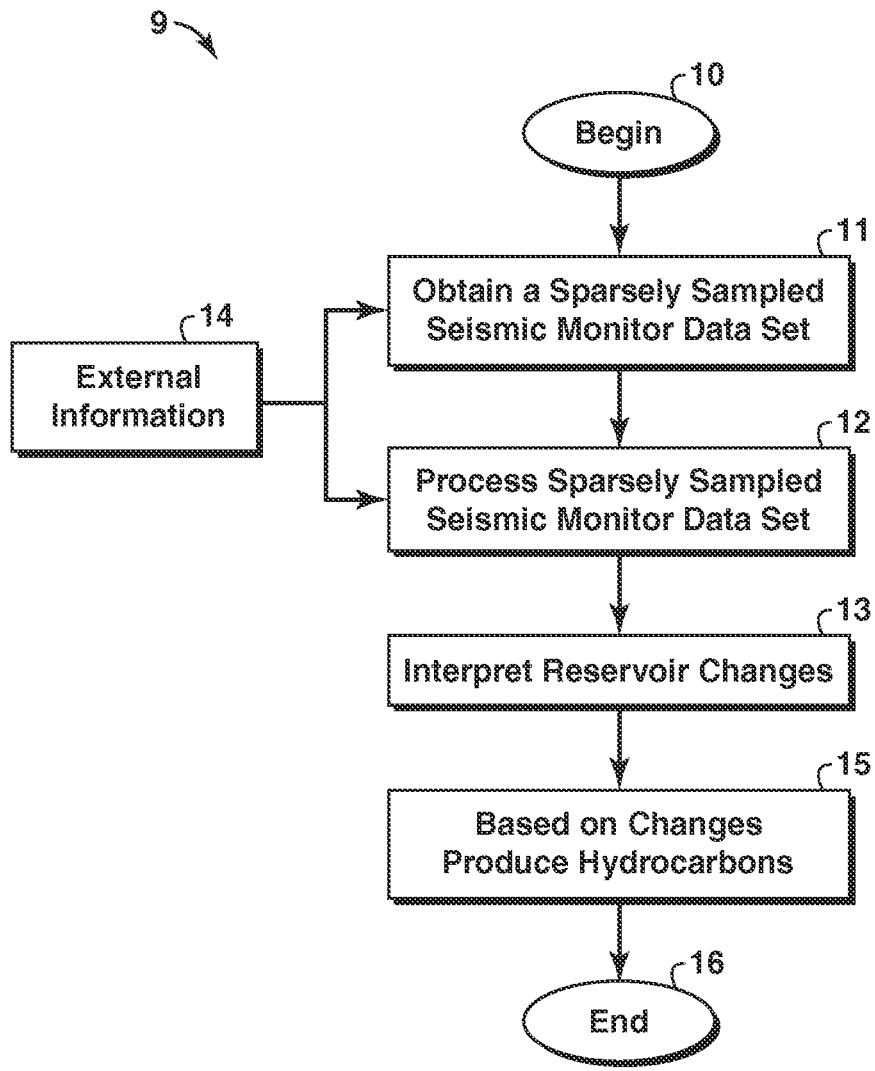
FIG. 1 shows a general flow diagram according to certain embodiments of the present invention.

As mentioned above, traditional time-lapse monitor surveys have been full-scale or fully sampled 3D surveys with a density of source and receiver locations similar to that of the initial base survey. Even under good conditions, this can be costly, and in some cases, producing infrastructure may make it operationally unfeasible/impractical to acquire a fully sampled set of monitor data from a monitor survey. A sparsely sampled set of monitor data, however, can result in an uninterpretable time-lapse survey because reservoir changes are typically obscured by non-repeatable artifacts and noise. As discussed further below, certain embodiments of the present invention disclose a technique wherein, instead of trying to perform a full interpretation of the sparsely sampled time-lapse monitor data set, such sparsely sampled monitor data set is used to process a transformed version of a predetermined fully sampled base survey data set of the target area to derive a full 3D monitor data set that is usable to generate a 3D representation of the target area as it exists at the time of acquisition of the sparsely sampled monitor data set.

According to one embodiment, an accurate representation of the target area may be initially determined (e.g., prior to determining to drill the target area) by conducting a fully sampled 3D seismic survey (e.g., a fully sampled base data set for a base survey). That is, at a first time, the fully sampled base data set is acquired for a base survey of the target area. Then, at a second time that may typically be later than the first time (e.g., typically one to three years later), a sparsely sampled monitor data set (e.g., a sparsely sampled seismic monitor data set) is acquired for the target area. In certain embodiments, such sparsely sampled monitor data set that is acquired for the later time-lapsed monitor survey is so limited that it alone is insufficient to generate an accurate 3D representation of the target area.

The obtained fully sampled base data set of the base survey is transformed from a first domain into a second domain (e.g., a base transformation domain). The first and second domains may include a space-time domain, frequency domain and/or curvelet domain. A change to the transformed fully sampled base data set in the second domain (i.e., the transformed base survey data set) is determined that, when inverse transformed, it reproduces the obtained sparsely sampled monitor data set. Preferably, the smallest change in the transformed fully sampled base data set is determined that, when inverse transformed, it reproduces the obtained sparsely sampled monitor data set.

The transformed fully sampled base data set is then modified by the determined change (e.g., the determined smallest change). For example, one solution may solve an object function as noted further below. The modified transformed fully sampled base data set is then inverse transformed from the second domain into the first domain or another domain to generate a fully sampled reconstructed monitor data set for the target area as it exists at the second time. Then, conventional 3D imaging (e.g., conventional 3D seismic imaging) may be employed for processing the fully sampled reconstructed monitor data set to compute a 3D representation of the target area as it exists at the second time.

FIG. 1 shows an exemplary flow diagram 9 according to certain embodiments of the present invention. The process begins at block 10. At block 11, a sparsely sampled seismic monitor data set is obtained for the target area being analyzed. In block 12, the sparsely sampled seismic monitor data set is processed to generate a 3D representation of the target area (e.g., the reservoir), and in block 13 the generated 3D representation is analyzed to interpret reservoir changes that have occurred since the previous survey (e.g., the base survey or a previous monitor survey). Based on the interpreted reservoir changes, hydrocarbons or other resources may be produced from the reservoir, as shown in block 15. For instance, the reservoir changes may be used to determine specific regions of the reservoir that need to have an injection or production well located to further enhance production. Regardless of the specific production operations, the process ends at block 16.

It should be recognized that the operational flow of blocks 11-13 generally correspond to conventional techniques for performing a time-lapsed monitor survey, except conventionally a fully sampled seismic monitor data set is acquired instead of only a sparsely sampled seismic monitor data set being obtained in block 11 in this embodiment. The sparsely sampled seismic monitor data set may be obtained, for example, by employing (in the seismic data acquisition) less density of source and receiver locations than that commonly employed for an initial base survey. In certain embodiments, the sparsely sampled seismic monitor data set that is obtained in block 11 is so limited that it alone is insufficient to generate an accurate 3D representation of the target area. As may be appreciated, the data sets for the surveys may include other data types, such as electromagnetic, magnetic or the like.

However, accuracy of the 3D representation of the target area is achieved through use, in block 14, of certain external information in addition to the acquired sparsely sampled seismic monitor data set for generation of the 3D representation. According to certain embodiments, such external information is utilized in designing the acquisition of the sparsely sampled seismic monitor data set (of block 11) and/or in processing of the sparsely sampled seismic monitor data set (in block 12), thereby enabling a sparsely sampled seismic monitor data set to be acquired for the monitor survey while also enabling generation of an accurate 3D representation of the target area. As discussed further herein, external information, which may come from seismic or non-seismic sources, is used in certain embodiments to design a limited-effort acquisition program (for acquisition of the sparsely sampled seismic monitor data set in block 11). Additionally or alternatively, in certain embodiments the external information is incorporated into the processing of the acquired sparsely sampled seismic monitor data set (in block 12).

In one embodiment, the external information of block 14 may be a predetermined fully sampled base survey of the target area. More particularly, as discussed further herein, in certain embodiments the external information of block 14 may include a fully sampled data set of a base survey that is suitable for conventional 3D imaging, and specific locations within the target area (e.g., hydrocarbon bearing subsurface reservoir) where production-related changes are predicted at the time of conducting a monitor survey. A sparsely sampled seismic monitor data set is then recorded only near locations where production-related changes are predicted. The sparsely sampled seismic monitor data set is insufficient for use in conventional 3D imaging for accurately generating a 3D representation of the target area. However, according to certain embodiments, the data set of the base survey is used to reconstruct, from the obtained sparsely sampled seismic monitor data set, a fully sampled reconstructed monitor data set that is suitable for conventional 3D imaging to generate a 3D representation of the target area as the target area exists at the time the sparsely sampled seismic monitor data set is acquired.

Figure 2:
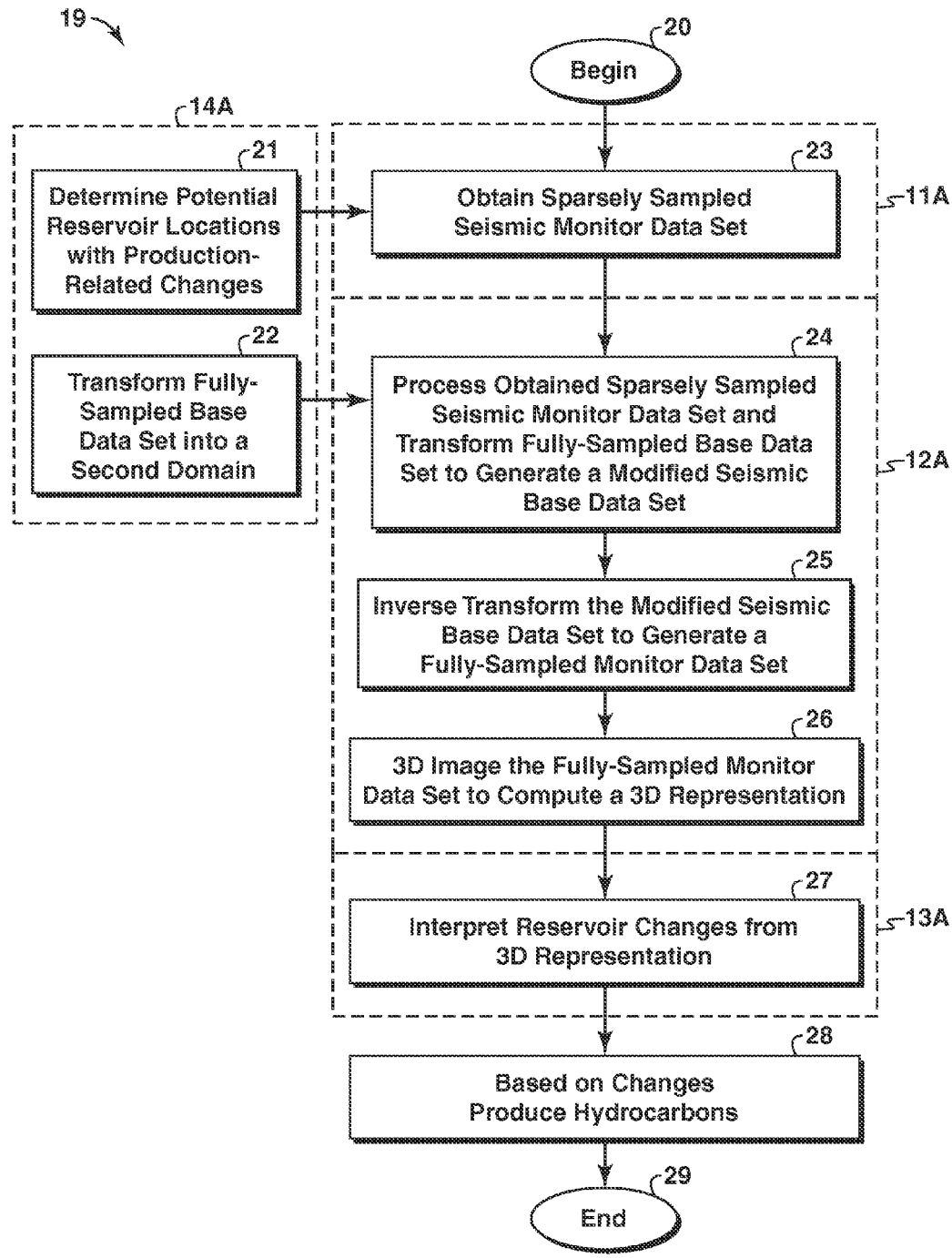
FIG. 2 shows an exemplary operational flow of one embodiment that uses a predetermined fully sampled base survey of a target area for determining, from a sparsely sampled seismic monitor data set acquired at a later time, a 3D representation of the target area as it exists at the later time.

Turning to FIG. 2, an exemplary operational flow diagram 19 of one embodiment is shown, which uses a predetermined fully sampled base survey of a target area for determining, from a sparsely sampled seismic monitor data set, a 3D representation of the target area. Exemplary operational blocks 11A, 12A, 13A, and 14A are shown, which correspond generally to the general operational blocks 11-14, respectively, of FIG. 1. In this exemplary embodiment, the external information 14A includes a predetermined fully sampled base survey data set (e.g., a fully sampled base seismic data set) of the target area, as discussed hereafter.

More particularly, in the example of FIG. 2, the external information 14A includes information identifying specific locations within the target area (e.g., hydrocarbon bearing subsurface reservoir) where production-related changes are predicted or estimated at the time of conducting a monitor survey, as shown in block 21. Such locations having estimated production-related changes may be determined in block 21 by running a reservoir simulation using multiple reservoir models, or other similar techniques.

The process begins at block 20. A sparsely sampled seismic monitor data set is then obtained in block 23. The sparsely sampled seismic monitor data set may be obtained at the locations identified in block 21 where production-related changes are estimated. The sparsely sampled seismic monitor data set obtained in block 23 is insufficient for use in conventional 3D imaging for accurately generating a 3D representation of the target area. However, as discussed further hereafter in this exemplary embodiment, the fully sampled seismic base data set is used to reconstruct, from the obtained sparsely sampled seismic monitor data set, a fully sampled reconstructed monitor data set that is suitable for conventional 3D imaging for accurately generating a 3D representation of the target area as the target area exists at the time the sparsely sampled seismic monitor data set is acquired.

Thus, in this example, a fully sampled seismic base data set that is suitable for conventional 3D imaging is predetermined for the target area, i.e., at a first time. As discussed further herein, such seismic trace gathers in the fully sampled seismic base data set is transformed from a first domain (e.g., space-time domain), in block 22, into a second domain (e.g., a base transformation domain, such as a curvelet domain) to result in a transformed fully sampled seismic base data set (i.e., transformed base seismic trace gathers). Thus, the fully sampled seismic base data set is transformed in block 22 into an appropriate transformation domain for representing wave fields, such as a curvelet domain, frequency domain, and/or other suitable domain.

The transformed fully sampled seismic base data set in the base transformation domain of block 22 and the obtained sparsely sampled seismic monitor data set (obtained in block 23) are processed in block 24 to generate a modified seismic base data set. In this block, the transformed fully sampled seismic base data set in the second domain is modified to match the obtained sparsely sampled seismic monitor data set. According to one embodiment, in block 24, an optimal change to the base transformation domain that, when inverse transformed, reproduces the obtained sparsely sampled seismic monitor data set is determined as discussed below, and the base transformation domain is modified by the determined optimal change (e.g., smallest difference) to result in a modified seismic base data set.

In block 25, the modified seismic base data set resulting from block 24 is inverse transformed to generate a fully sampled seismic monitor data set for the target area as it exists at the time the sparsely sampled seismic monitor data set is acquired. Then, in block 26, 3D imaging may be employed for processing the constructed fully sampled seismic monitor data set to compute a 3D representation (i.e. 3D image) of the target area as it exists at the time the sparsely sampled seismic monitor data set was acquired. In certain embodiments, because a fully sampled seismic monitor data set is created, conventional seismic 3D imaging techniques may be employed for processing such fully sampled seismic monitor data set to generate the 3D representation of the target area, such as a 3D image or 3D model. In operational block 27, the reservoir changes are interpreted/analyzed from the 3D representation. These reservoir changes may be used, for example, to determine an appropriate management strategy to employ for extracting hydrocarbon reserves from the target area, as shown in block 28. Regardless, the process ends at block 29.

Accordingly, as a specific example of an embodiment of FIG. 2, the fully sampled seismic base data set from a base survey of the target area, B(x,y,t), is transformed, in operational block 22, from the space-time domain into the curvelet domain, or to any other domain that is appropriate for representing locally varying wave-fields: $B_C(v)=C[B(x,y,t)]$, where C represents the curvelet transformation, v is the vector of transformed variables, and $B_C(v)$ is the transformed fully sampled seismic base data set in the curvelet domain. In this example, B(x,y,t) represents base survey seismic traces (amplitude as a function of time) associated with location (x,y). The data associated with location (x,y) is typically some kind of "gather" of traces. For example, a shot gather for a base survey at a first time, wherein the traces from a shot located at (x,y), may be recorded on receivers that are active when the shot was fired. Other common types of gathers are receiver gathers, common midpoint gathers, and common offset gathers, as are well-known in the art. The curvelet transform may be applied to individual gathers, although the type of gather employed may be case-dependent. For more information regarding curvelet transformations, see Candes, E., L. Demanet, D. Donoho, and L. Ying, 2006, *Fast Discrete Curvelet Transforms: SIAM Multiscale Model*, Simul., vol. 5, no. 3, pp. 861-899. Regardless, common source gathers or other gathers may be used.

If the sparsely sampled monitor data set M(x,y,t) from the monitor survey at a second time has been recorded with data traces at the same locations as some of the traces from the fully sampled base survey, a full monitor gather (e.g., the modified seismic base data set $B'_C(v)$) may be reconstructed by, in block 24, modifying the transformed fully sampled seismic base data set $B_C(v)$ in a constrained fashion (e.g., minimize difference or smallest change $\delta(v)$) to obtain the modified seismic base data set $B'_C(v)$ (that is, $B'_C(v)=B_C(v)+\delta(v)$), so that the gather reconstructed by using the modified seismic base data set $B'_C(v)$ matches the traces in the obtained sparsely sampled seismic monitor data set. A substantial but not exact matching will work in the inventive method, but there is no reason to settle for this because the problem will normally be underdetermined and so the computer program algorithm will always be able to find a change that makes all differences (between the recorded sparse data and the modified fully sampled data) zero. Note that the requirement in this embodiment of the invention is that the change reproduce the sparsely sampled monitor data set at those locations where the sparsely sampled monitor data set was recorded. However, being applied in the transform domain, the change affects values everywhere (after transforming back to the original space-time domain), not just at the sparse locations. An example of a specific algorithm for determining $\delta(v)$ is to minimize the objective function $|\delta(v)|^2+\lambda(C^{-1}[B_C(v)+\delta(v)]-M(x,y,t))$, where $\delta$ is a Lagrange multiplier. Other minimization criteria may also be used, as long as the reconstructed monitor is constrained to match the recorded monitor. The reconstructed monitor gather or fully sampled seismic monitor data set for the target area is the inverse transform of the modified base gather (e.g., inverse transform of the modified seismic base data set): $M_R(x,y,t)=C^{-1}[B'_C(v)]$. Applying this process to the gathers in the pair of time-lapse surveys results in a constructed fully sampled seismic monitor data set for the target area, which represents a data set from a fully sampled seismic monitor survey that can be processed using conventional methods.

This exemplary implementation uses an interpreter (e.g. expert human interpreter or software program) to identify, in block 21, specific locations in the target area (e.g., hydrocarbon bearing subsurface reservoir) where the seismic response may change after production (i.e., after a period of extraction of fluid, such as gas, oil, water, etc. from the subsurface reservoir). The interpreter may be a expert human interpreter or a software package that may be used to identify subsurface regions. This information is used to select locations that are used for the acquisition of the sparsely sampled seismic monitor data set.

Figure 3:
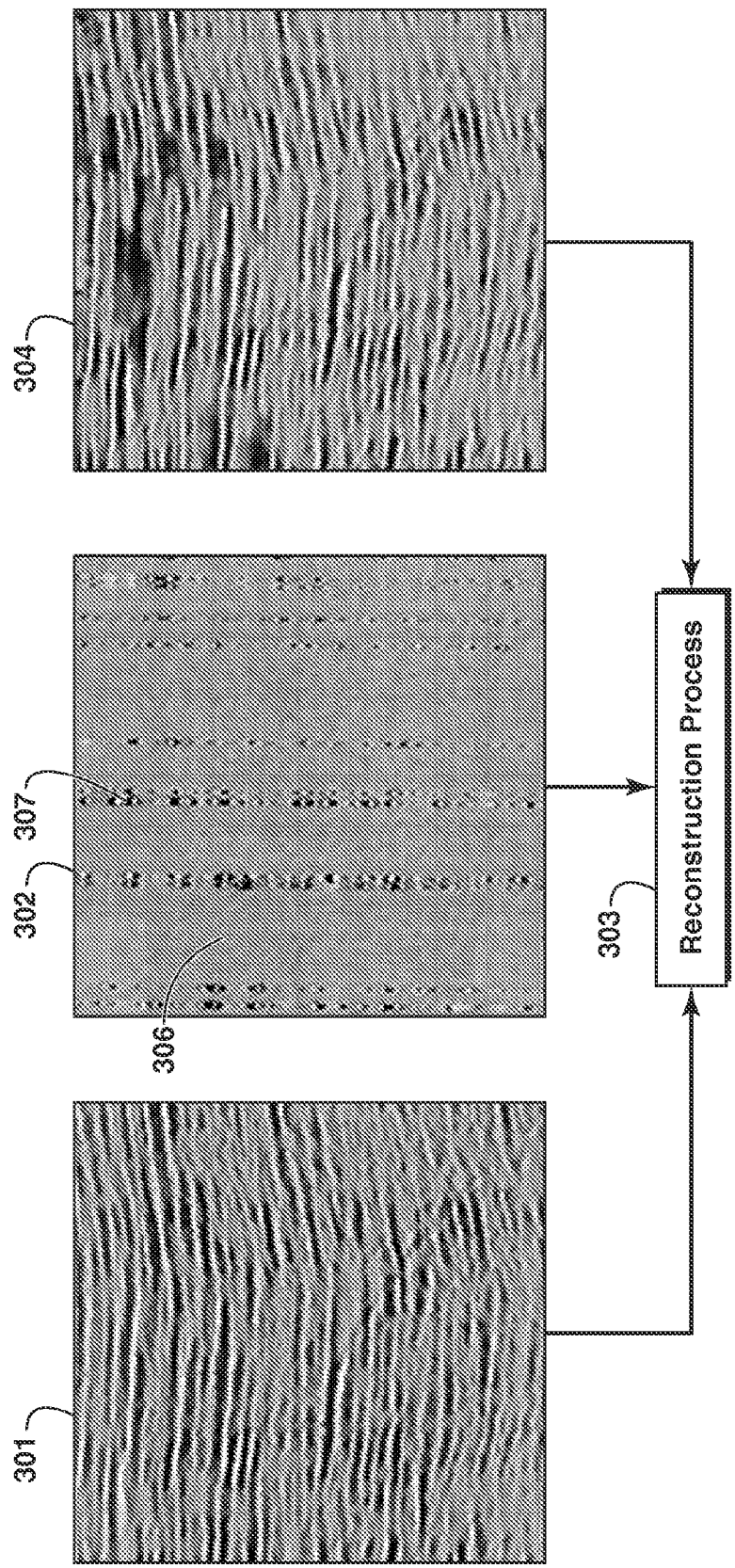
FIG. 3 illustrates another example of an embodiment in which a fully sampled base seismic survey and a sparsely sampled monitor seismic survey are processed for reconstructing a fully sampled monitor seismic survey.

Turning to FIG. 3, another example of an embodiment is shown in which a fully sampled base seismic survey representation 301 of the fully sampled seismic base data set, B(x,y,t), is determined for a target area at a first time (time 1). In the example, the fully sampled seismic base data set B(x, y,t) is a common offset gather, but it could be some other gather or even an image from the full survey in certain embodiments. A sparsely sampled seismic monitor survey representation 302 of sparsely sampled monitor data set, M(x, y,t), is acquired for the target area at a later time (e.g., a second time). The illustration 302 is a generic representation of gathers of seismic traces, wherein the vertical dashed lines, such as dashed line 307, represent individual seismic traces in this example and the solid lines, such as line 306 represent no seismic traces collected for this location. The fully sampled seismic base survey representation 301 and the sparsely sampled seismic monitor survey representation 302 are processed in a reconstruction process 303 to create a fully sampled reconstructed monitor seismic survey representation 304 of the fully sampled seismic monitor data set, $M_R(x,y,t)$ for the target area at the later time (e.g., a second time). An exemplary reconstruction process 303 that may be employed for deriving the fully sampled seismic monitor survey representation 303 is described above with reference to blocks 22-26 of FIG. 2.

Because a fully sampled seismic monitor survey representation 304 is derived in this example, conventional seismic 3D imaging techniques may be employed for processing such reconstructed fully sampled monitor seismic survey representation 304 to generate the 3D representation of the target area as it exists at the later time. Thus, an accurate 3D representation of the target area as it exists at the later time can be generated without a full sampling of data acquisition at the later time. Instead, a sparsely sampled seismic monitor data set acquired for the target area at the later time is sufficient for use with the predetermined fully sampled seismic base data set for deriving a fully sampled seismic monitor data set that can be processed for accurately generating a 3D representation of the target at as it exists at the later time.

Thus, according to one embodiment, the fully sampled seismic base data set is transformed from the space-time B domain (but not necessarily, by individual gathers) into the curvelet C domain (the B→C transformation). Next, a small modification to the transformed fully sampled seismic base data set in the C domain is made, and then it is transformed back into the B domain, where the modified seismic base data set is checked against the recorded monitor traces of the sparsely sampled seismic monitor data set. This process is iterated until the smallest change in the transformed fully sampled seismic base data set that reproduces the monitor traces is found. The result is a data set that has the same sampling as the base survey, matches the data set of the monitor survey at the locations where monitor traces were recorded, and, because of the properties of the curvelet transform, and behaves like a wavefield between the monitor recording locations.

An efficient process for modifying the transformed fully sampled seismic base data set to match the sparsely sampled monitor data set may be an iterative one, such as that described above, that involves repeated transformations back and forth between the different domains, such as the space-time domain and curvelet domain of the above example. Depending on the factors or details of the base survey and the reservoir, the survey (gather) may not have to be transformed back to space-time domain to evaluate matched the recorded monitor traces. The full transformation may not be done until a desired match is detected. But, there may be cases in which the full inverse transformation may be performed for each iteration. While this is somewhat inefficient, it is still more efficient than acquiring a fully sampled seismic monitor data set.

Embodiments, or portions thereof, may be embodied in program or code segments operable upon a processor-based system (e.g., computer system) for performing functions and operations as described herein. The program or code segments making up the various embodiments may be stored in a computer-readable medium, which may include any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Figure 4:
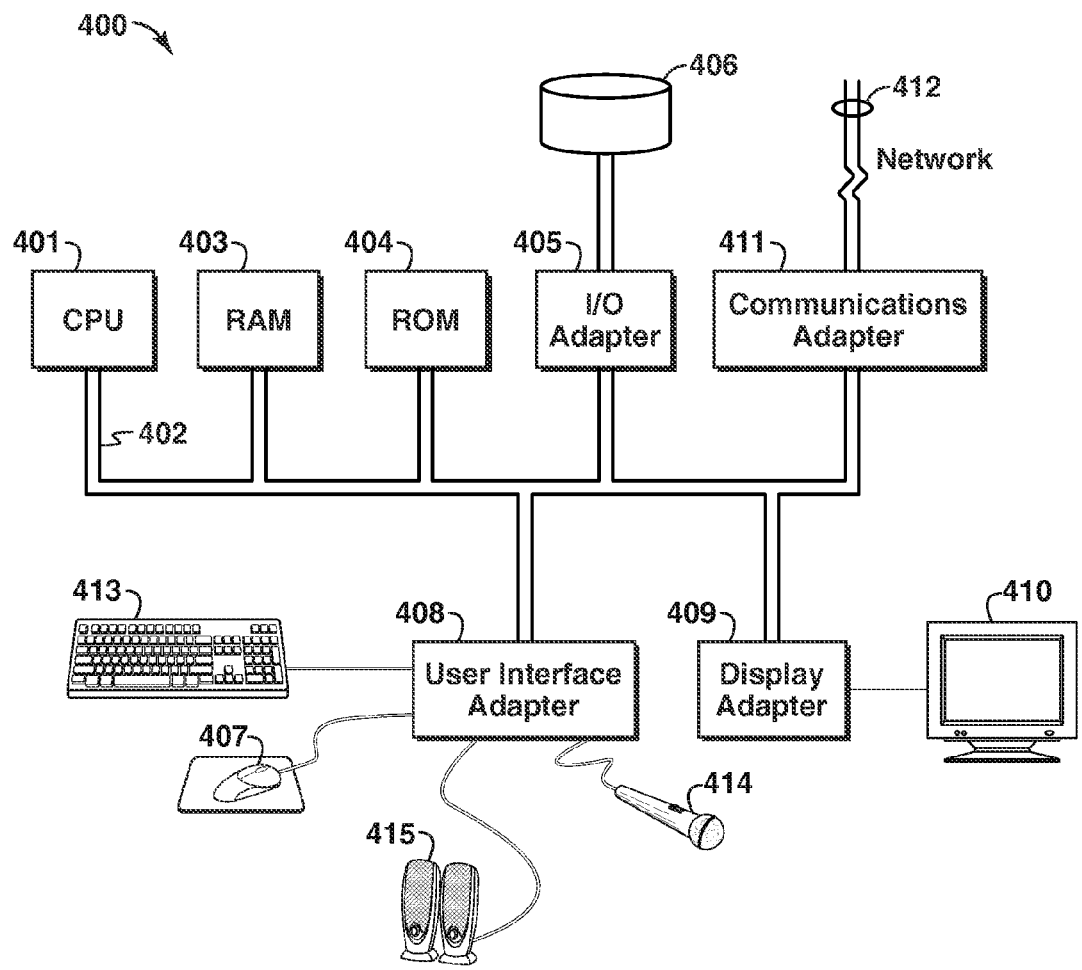
FIG. 4 shows an exemplary computer system which may implement all or portions of certain embodiments of the present invention.

FIG. 4 illustrates an exemplary computer system 400 on which software for performing processing operations of embodiments of the present invention may be implemented. Central processing unit (CPU) 401 is coupled to system bus 402. CPU 401 may be any general-purpose CPU. The present invention is not restricted by the architecture of CPU 401 (or other components of exemplary system 400) as long as CPU 401 (and other components of system 400) supports the inventive operations as described herein. CPU 401 may execute the various logical instructions according to embodiments. For example, CPU 401 may execute machine-level instructions for performing processing according to the exemplary operational flow described above in conjunction with FIGS. 1-3. For instance, CPU 401 may execute machine-level instructions for performing operational blocks 24, 25, and 26, as examples, of FIG. 2.

Computer system 400 also preferably includes random access memory (RAM) 403, which may be SRAM, DRAM, SDRAM, or the like. Computer system 400 preferably includes read-only memory (ROM) 404 which may be PROM, EPROM, EEPROM, or the like. RAM 403 and ROM 404 hold user and system data and programs, as is well known in the art.

Computer system 400 also preferably includes input/output (I/O) adapter 405, communications adapter 411, user interface adapter 408, and display adapter 409. I/O adapter 405, user interface adapter 408, and/or communications adapter 411 may, in certain embodiments, enable a user to interact with computer system 400 in order to input information.

I/O adapter 405 preferably connects to storage device(s) 406, such as one or more of hard drive, compact disc (CD) drive, floppy disk drive, tape drive, etc. to computer system 400. The storage devices may be utilized when RAM 403 is insufficient for the memory requirements associated with storing data for operations of embodiments of the present invention. The data storage of computer system 400 may be used for storing such information as a fully sampled base survey data 201, identification of potential target area locations with production-related changes (as in block 21 of FIG. 2), an acquired sparsely sampled seismic monitor data set 202, a base transformation domain (as determined in block 22 of FIG. 2), a modified base transformation domain (as determined in block 24 of FIG. 2), a fully sampled reconstructed monitor survey 203, a generated 3D representation (e.g., as generated in block 26 of FIG. 2), and/or other data used or generated in accordance with embodiments of the present invention. Communications adapter 411 is preferably adapted to couple computer system 400 to network 412, which may enable information to be input to and/or output from system 400 via such network 412 (e.g., the Internet or other wide-area network, a local-area network, a public or private switched telephony network, a wireless network, any combination of the foregoing). User interface adapter 408 couples user input devices, such as keyboard 413, pointing device 407, and microphone 414 and/or output devices, such as speaker(s) 415 to computer system 400. Display adapter 409 is driven by CPU 401 to control the display on display device 410 to, for example, display information pertaining to a target area under analysis, such as displaying a generated 3D representation of the target area, according to certain embodiments.

It shall be appreciated that the present invention is not limited to the architecture of system 400. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for constructing a fully-sampled monitor survey, the method comprising:
   obtaining a fully sampled base data set of a subsurface region at a first time;
   obtaining a sparsely sampled monitor data set for the subsurface region at a second time, wherein the sparsely sampled monitor data set is a data set for which the sampling at acquisition was less dense than in the fully sampled base data set;
   transforming, using a computer, the obtained fully sampled base data set from a first domain into a second domain;
   determining a change to the transformed fully sampled base data set that, when inverse transformed, reproduces the obtained sparsely sampled monitor data set at locations where the sparsely sampled monitor data set was recorded;
   modifying the transformed fully sampled base data set in the second domain by the determined change to generate a modified base data set;
   inverse transforming the modified base data set into the first domain to generate a fully sampled monitor data set for the subsurface region as it exists at the second time; and
   processing the generated fully sampled monitor data set to compute a three-dimensional (3D) representation of the subsurface region as it exists at the second time, wherein the 3D representation comprises a 3D image.

2. The method of claim 1 wherein the second time is later than the first time.

3. The method of claim 1 wherein the first time is later than the second time.

4. The method of claim 1 wherein the fully sampled base data set is a fully sampled base seismic data set.

5. The method of claim 1 wherein the obtained sparsely sampled monitor data set includes data specific to portions of the subsurface region that are capable of sensing changes in seismic response of the specific portions of the subsurface region.

6. The method of claim 1 wherein the determining the change to the transformed fully sampled base data set comprises determining a smallest change to the transformed fully sampled base data set that, when inverse transformed, reproduces the obtained sparsely sampled monitor data set.

7. The method of claim 1 wherein the second domain is a curvelet domain.

8. The method of claim 4 wherein the sparsely sampled monitor data set is insufficient alone for generating a 3D representation of the target area as it exists at the second time.

9. The method of claim 1 wherein the first domain is one of space-time domain and frequency-wavenumber domain.

10. A method for processing a sparsely sampled survey of a target area, the method comprising:
    obtaining a fully sampled base data set for a target area at a first time;
    obtaining a sparsely sampled monitor data set for the target area at a second time that is different from the first time, wherein the sparsely sampled monitor data set is a data set for which the sampling at acquisition was less dense than in the fully sampled base data set;
    computing, based on the obtained sparsely sampled monitor data set and the fully sampled base data set, a fully sampled monitor data set, wherein said computing is performed using a computer; and
    processing the fully sampled monitor data set to provide a 3D representation of the target area as it exists at the second time, wherein the 3D representation comprises a 3D image.

11. The method of claim 10 wherein computing comprises transforming the obtained fully sampled base data set from a first domain to a second domain.

12. The method of claim 11 further comprising:
    determining a change to the fully sampled base data set that, when inverse transformed, reproduces the obtained sparsely sampled monitor data set;
    modifying the transformed fully sampled base data set by the determined change; and
    inverse transforming the modified transformed fully sampled base data set to generate a fully sampled monitor data set for the target area as it exists at the second time.

13. The method of claim 12 wherein the fully sampled monitor data set is a fully sampled seismic monitor data set.

* * * * *